Oct. 29, 1929.  H. B. W. SNELLING  1,733,245
MOTORIST'S RECEPTACLE
Filed Dec. 9, 1927
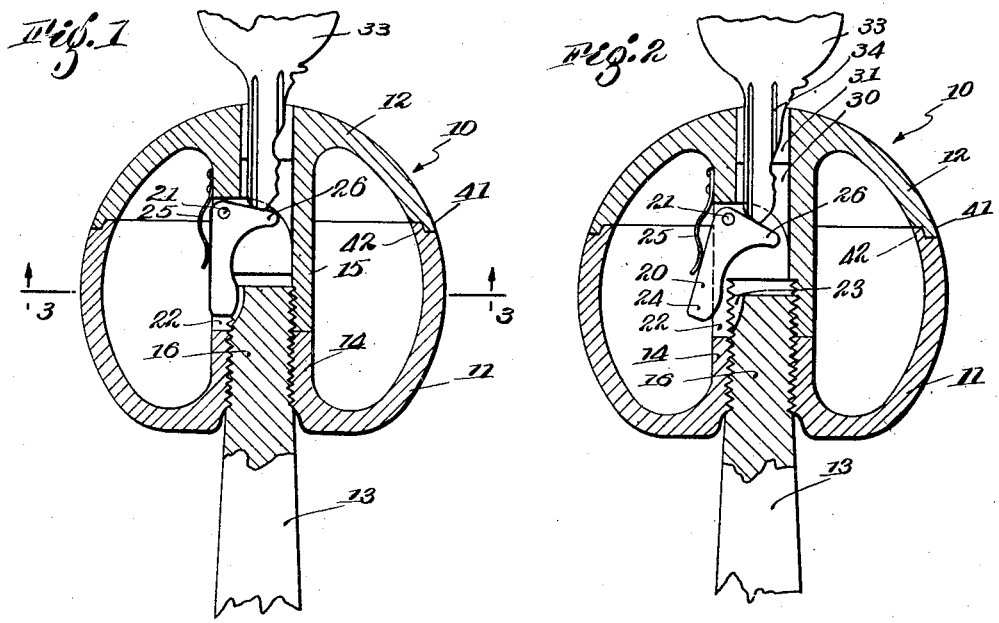
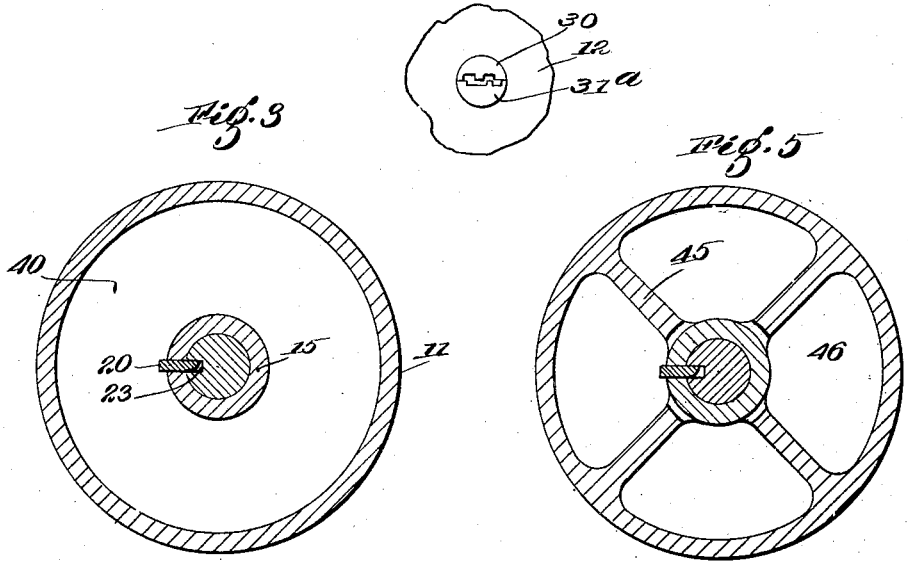
Inventor
Henry B. W. Snelling.
by Blacks, Cushman & Woodberry
Attys.

Patented Oct. 29, 1929

1,733,245

UNITED STATES PATENT OFFICE

HENRY B. W. SNELLING, OF CONCORD, MASSACHUSETTS

MOTORIST'S RECEPTACLE

Application filed December 9, 1927. Serial No. 238,862.

This invention relates to an improvement in a motorist's receptacle adapted to be incorporated in and made a part of the car and to receive and protect the car license and other articles that should be kept with the car at all times.

Every motorist is faced with the necessity of keeping with the car the car license so that it can be promptly produced at any time. The common practice of placing the car license in one of the pockets of the car is objectionable, because in case the car is stolen it is a simple matter for the thief to find the license and pass himself off as the owner of the car. Various attempts have been made to overcome this difficulty by hiding the license under the seat or behind the dash board, but such attempts have usually proven futile, because it has been found that the usual practice of the thief, if he does not find the license in the pocket of the car, is to look in obvious hiding places. The provision of any ordinary kind of a locked safe receptacle which might avoid this difficulty would defeat its own purpose in large part by inconvenience of access to the seated driver and the time required to extract the document. There is little room available for a locker within the driver's reach.

One object of this invention is to provide a receptacle which can be substituted for one of the necessary elements of the car equipment and in which the car license and other articles may be received. In the particular embodiment herein shown and described the receptacle is substituted for the handle or knob of the gear shift or hand brake lever so that under ordinary conditions it functions as a handle for the lever, and at the same time provides a safe, accessible and concealed receptacle to receive the car license and other necessary articles. In a preferred form, the receptacle provides a lock preventing malicious removal of the lever handle.

In the drawing,

Fig. 1 is a sectional view of a receptacle embodying one form of this invention mounted upon the end of a lever to function as a knob handle therefor, and shown in the locked position;

Fig. 2 is a view similar to Fig. 1, the receptacle being shown in the unlocked position;

Fig. 3 is a transverse section taken along the line 3—3 of Fig. 1 in the direction of the arrows;

Fig. 4 is a top plan view of the receptacle; and

Fig. 5 is a view similar to Fig. 3 of another embodiment of this invention.

The knob shown in the drawing as embodying this invention and indicated generally by the reference character 10 is made up of two sections, a base section 11 and a cover section 12, and is mounted upon the end of a lever 13. The sections 11, 12 are each hollow and each includes a central internally threaded sleeve designated as 14 and 15 respectively. The base section 11 is mounted upon the threaded upper end 16 of the lever 13 by means of the sleeve 14. The cover section 12 is also mounted on the end 16 of the lever 13, the sleeve 15 being screwed down to lock against and prevent loosening of the base section 11. In order to lock the cover section 12 removably in place a pawl 20 is mounted on a pin 21 to reciprocate in a key slot 22 milled in one side of the sleeve 15. In the upper end 16 of the lever 13 is cut a notch 23 with which the end 24 of the pawl 20 engages when the parts are locked in place, the end 24 being normally held in the notch 23 by a plate spring 25.

In order to unlock the pawl 20 pressure may be applied to the end 26 causing it to swing on the pin 21 and remove the end 24 from engagement with the notch 23. In order to afford access to the pawl 20 a bore hole 30 is provided axially in the top of the cover section 21 into the interior of the sleeve 15. The hole 30 can be filled by a plug 31 which may be longitudinally split at 31ª and driven in, the halves of the plug forming a passage 32 through which an instrument may be introduced to press on the end 26 and swing the pawl 20 around the pin 21. While a lock barrel rotated by the key and adapted to move the pawl 20 might be provided, it is sufficient merely to provide for unlocking the pawl 20 by end thrust of a key otherwise provided for the car. One of the necessary elements of each car is an ignition key and it has been found desirable to form the passage 32 through the plug 31 to permit the entry of the ignition key 33, the general practice being to provide a key of the longitudinally corrugated type having depressions 34 in one or both faces. The walls 35 of the passage 32 may be formed with projections interfitting with the key so that only a key having the necessary depressions can be employed to actuate the lock.

Between the central sleeve of each of the sections and the outer walls of the sections is formed an annular compartment 40 which is of sufficient size to contain the car license. The edges of the sections 11 and 12 at their contacting faces may be provided with complementary shoulders 41, 42 to protect the compartment 40 against the entry of moisture or dust. Certain types of cars are not provided with ignition keys but are provided with keys to lock the transmission or other mechanism and prevent theft. If the receptacle is to be used on a car of this type the passage 32 will be formed to permit the entry of the transmission lock key. The mouth of the passage 32 is small and inconspicuous and would not be noticed without a very careful inspection of the car so that the fact that the knob constitutes a receptacle would hardly be noticed.

The knob 10 is substituted for the usual knob in the following manner: The base section 11 is screwed down onto the end 16 of the lever 13 until it reaches its lowest point. The cover section 12 is then screwed down onto the end 16 of the lever 13 until it engages with the base section 11 at the upper base of the sleeve 14. The edge of the end 24 of the pawl is beveled on one side so that the notch 23 will not interfere with the screwing on movement of the cover section.

From one to four notches 23, shown as one, may be provided in the end of lever 13 so that when the cover section has been screwed down toward the end 16, the pawl comes into line with one of the notches 23, the key is removed, and the cover section turned until the pawl drops into one of the notches 23. Looseness of fit between sections of the receptacle may now be taken up by turning section 11 to lock against section 10. When access to the compartment 40 is desired for the purpose of displaying the car license or of removing any articles the key 33 is inserted into the passage 32 to unlock the pawl 20 and the cover section 12 may then be turned back until it is disengaged from the threaded end 16 of the lever.

It will be noted that not only does the knob 10 constitute a receptacle but it also constitutes a lock nut for the knob on the lever 13. Every motorist has experienced having the lever knob loosen or even come off and this is avoided by the use of the present invention since the cover section 12 is positively locked in place and prevents any loosening of the base section 11.

Under certain circumstances it may be considered desirable to provide a plurality of compartments in the receptacle in place of the single compartment 40, for example by providing a plurality of webs 45 which, as shown in Fig. 5, divide the base section 13 into compartments 46, useful for nails, screws, cotter pins, or other small parts. The car license may be folded and placed in one of the compartments 45 or may be laid on top of the compartments.

By means of the construction above set forth it is possible for a car manufacturer to employ as standard equipment in place of the usual knob on the lever a knob embodying this invention, the walls 35 of the passage 32 being formed to receive the ignition or transmission key with which the car is provided. The knob 10 may also be supplied to a car owner to be substituted for the knob originally provided in the car, the passage 32 being differently formed for different cars so that a receptacle may be provided to be unlocked by any car key. It will be noted that the plug 31 defining the passage 32 enables the passage 32 to be adapted for the key of any desired model or make of car, plugs 31 with suitable different kinds of passages being provided to be driven into the center hole of the receptacle cover for each different make of car.

I claim:

1. A motorist's receptacle comprising separable actions, including a base section secured to a necessary element of the car, and a cover section adapted to be removably secured on said element and also secured removably to said base section, said sections providing a compartment for a car license or the like which compartment is opened when the cover section is separated from the base section, the cover section normally preventing removal of the assembled base and cover sections.

2. A motorist's receptacle comprising a hollow lever handle, said handle being made of two readily separable sections, one section forming the base and the other section forming the cover of said receptacle, means for mounting the base section upon said lever and means for removably securing said cover section to said lever and upon said base section, said sections together providing a compartment which may receive a car license or the like.

3. A motorist's receptacle consisting of a hollow knob handle for a lever, said knob handle being made of two sections, one section forming the base and the other section forming the cover of said receptacle, each section including a central sleeve adapted to engage the end of said lever and means for locking the cover section upon said lever, thereby securing said base section in place and completing a receptacle within which a car license or the like may be enclosed.

4. A motorist's receptacle consisting of a hollow handle knob for a lever, said knob being made of two sections, one section forming the base and the other section forming the cover of said receptacle, each section including a central sleeve adapted to engage the end of said lever and means for locking the cover section upon a part of said lever projecting through the base section, thereby securing said base section in place and completing a receptacle within which a car license or the like may be enclosed, said locking means being actuable by one of the car keys to release said cover section and permit its removal from said lever to open said receptacle.

5. Handle receptacle for a lever of a motor car comprising a base section having a hole penetrated by a part of the lever and a cover section carrying means for interlocking the cover section and the end of the lever, said interlocking means having a part adapted to be moved to unlock the cover by a key, the cover housing an opening to receive the key.

Signed by me at Boston, Massachusetts, this 29th day of November, 1927.

HENRY B. W. SNELLING.